April 8, 1958
C. V. TILDEN
2,829,898
PERCUSSIVE TOOL CHUCK
Filed May 22, 1956
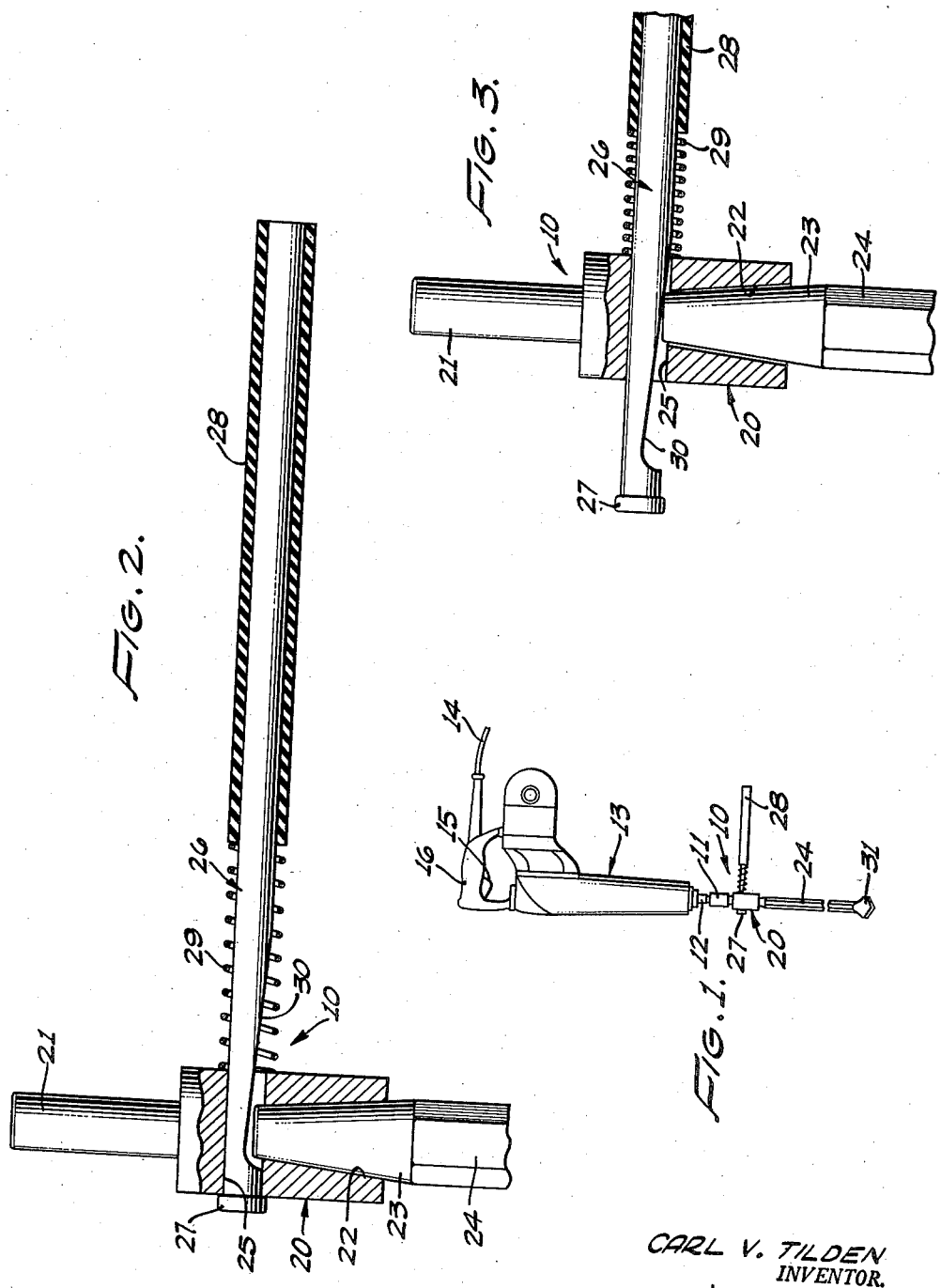
CARL V. TILDEN
INVENTOR.
BY
ATTORNEY United States Patent Office 2,829,898
Patented Apr. 8, 1958

2,829,898

PERCUSSIVE TOOL CHUCK

Carl V. Tilden, Capistrano Beach, Calif.

Application May 22, 1956, Serial No. 586,545

6 Claims. (Cl. 279—19)

This invention relates to tool chucking devices and more particularly to an improved drill chuck for use on percussive power units and featuring common means for changing the point of attack of the drill teeth during normal use and for disengaging the drill from the chuck at other times.

Drill bits and the like working tools commonly employed with percussive power units are customarily provided with mounting shanks having a Morris taper adapted to seat in a similarly tapered socket of a chucking device. Some provision must be made for disengaging the tool from the chuck, a common expedient for this purpose being the use of a drift pin driven into a transverse opening through the chuck intersecting the end of the tool shank. This practice though simple and effective, is subject to certain disadvantages. For example, the drift pin is easily misplaced or left at the point of tool servicing which is frequently remote from the place of use with the result that time is lost in replacing a damaged tool with a new one. Sometimes the drift pin is tied to the power unit but this is not a satisfactory practice because the dangling pin interferes with the use of the tool. It has also been found impractical to fasten the drift pin immovably to the power unit because the severe shock and vibration operating conditions inherent in the use of percussive tools loosen the fastening means and the workmen frequently neglect to fasten the pin in place after using it.

The present invention provides a tool chuck obviating the foregoing and other disadvantages of prior chucking devices while presenting certain new and desirable features as will appear more fully below. For example, the chuck of this invention incorporates a working tool dislodging device permanently assembled thereto and normally useful to vary the point of attack of the cutting teeth while the tool is in use and immediately available to dislodge the working tool from the chuck. Being inseparably assembled to the chuck, the dual function drift pin and handle member cannot become displaced or separated from the chuck; nor does it interfere with the normal use of the tool owing to its design in a manner to be employed as a manipulating handle for the percussive tool.

In view of the foregoing factors and conditions characteristic of chucking devices for use on percussive tools and the like, it is a principal object of this invention to provide a new tool chuck having a tool disengaging means permanently assembled to the chuck.

Another object of this invention is the provision of a percussive tool chuck having a rigid member movably supported on the chuck and operable to disengage a working tool therefrom at one time and, at other times, providing convenient means for shifting the working end of the tool relative to its own axis to vary the point of attack of its cutting teeth.

A further object of the invention is the provision of a percussive tool chuck having a drift pin inseparably assembled thereto and normally held in a retracted position wherein it is ineffective to disengage a working tool from the chuck.

A more specific object of the invention is the provision of a tool chuck having an attached drift pin spring biased to an inactive position with its outer end providing a convenient handle for use in the manipulation of the percussive tool.

These and other more specific objects will appear upon reading the following specification and claims and upon considering in connection therewith the attached drawing to which they relate.

Referring now to the drawing in which a preferred embodiment of the invention is illustrated:

Figure 1 is an elevational view showing the chucking device of the present invention mounted in an electrically driven percussive tool and having a typical cutting tool supported in the chucking device;

Figure 2 is an enlarged view of the chucking device proper with portions broken away to show details of the construction; and Figure 3 is a view similar to Figure 2 but showing the position of parts as a working tool is being dislodged from the chuck.

Referring to the drawing and first to Figure 1, it will be noted that the chucking device constituting the present invention and designated generally 10 is shown mounted in a clamping chuck 11 secured to the lower end of a plunger 12 reciprocably mounted in a power unit designated generally 13. It will be understood that power unit 13, though here shown as being of the electrically actuated type, may be pneumatically driven by a driving mechanism operating on compressed air, plunger 12 being rapidly reciprocated by either type of driving means to operate the cutting tool. In the power unit illustrated, an electric motor enclosed by the housing of unit 13 is supplied with power from any convenient source through a service cord 14 and is controlled by a switch 15 movably mounted in a hand grip member 16.

Referring more particularly to Figures 2 and 3, it will be seen that the chucking device of the present invention includes a generally cylindrical main body 20 having a mounting shank 21 projecting axially from its upper end. Opening axially through the opposite end of main body 20 is a working tool socket 22 having a Morris taper adapted to firmly seat a complementary taper on the shank 23 of a typical working tool such as rock drill 24. The inner end of socket 22 opens through the wall of a cylindrical bore 25 extending diametrically of main body 20.

Reciprocably mounted in bore 25 of the chuck body is a drift pin 26 one end of which is upset to provide a head 27 engageable with the side wall of the chuck body and providing a stop limiting movement of the pin to the right as viewed in Figures 2 and 3. Securely fixed by cement or otherwise to the opposite end of the drift pin is a resilient layer of soft rubber 28 providing a hand grip for the operator. Interposed between the main body of the chuck and the adjacent end of hand grip 28 is a compression spring 29 encircling the drift pin and effective to urge the pin to its retracted position with head 27 seated against the chuck body. The portion of pin 26 underlying spring 29 as well as the portion located within the chuck body is cut away as indicated to provide a flat camming surface 30 inclined to the axis of the pin and normally positioned out of engagement with the end of tool shank 23.

In use, the chucking device 10 constituting the present invention has its shank 21 securely mounted in clamping chuck 11 of any suitable percussive power unit such as that indicated at 13 in Figure 1, it being understood that the assembly has provision for rotary movement of chucking device 10 relative to the power unit. Any one of a great variety of working tools such as the drill 24 having sharp cutting teeth 31 at its lower end is mounted in chuck 20 simply by pressing its tapered shank 23 into the similarly tapered socket 22 of chuck device 10. Since spring 29 normally holds the combined handle and drift pin 26 in the position shown in Figure 2, the inclined camming surface 30 is spaced slightly from the end of the tool shank. The tool may be placed in operation to cut rock, concrete and the like as the operator holds the device upright with the weight thereof bearing against the cutting head 31. So long as the motor switch is held closed by trigger 15 the motor will reciprocate plunger 12, clutch device 10 and the working tool 24 seated therein through a short cycle to perform a cutting operation characteristic of percussively driven tools. The operator uses one hand on grip 16 to hold the tool in a desired cutting position while the other hand grasps hand grip 28 on the outer end of drift pin 26 to rotate the same slowly in opposite directions to vary the point of attack of cutting teeth 31.

Whenever it becomes desirable to replace a worn or damaged cutting tool, the operator merely moves drift pin 26 axially in opposition to spring 29 and then strikes the outer end of the pin with a sharp blow with a hammer or other suitable tool to force the inclined camming surface 30 across the end of the tool shank thereby disengaging the tool from socket 22. The tool having been dislodged in the expeditious manner described, drift pin 26 is released allowing spring 29 to return the pin to its normal position illustrated in Figure 2. A different tool may now be inserted in socket 22 with assurance that its inner end will not strike camming surface 30. If the drift pin should tend to rotate in bore 25 for any reason, one side edge of surface 30 will contact the end of the tool shank and arrest further rotation of the pin. It will therefore be understood that it is unnecessary to provide a key and slot arrangement for the purpose of holding the drift pin properly oriented in the body of the clutch.

While the particular chucking device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A working tool chuck device for use in a percussive type power unit, said device comprising a main body having a tapering socket for seating the similarly tapering shank of a working tool, a bore extending transversely of said socket, drift pin means assembled to said bore and movable therein, said drift pin having a cam surface movable into engagement with the shank end of a tool protruding into said bore while seated in said tapering socket, spring means normally holding said drift pin means in retracted position while permitting said pin means to be shifted bodily against the tool shank to disengage the latter from seating engagement in said tapering socket.

2. A working tool chuck device for use in a percussive type power unit, said device comprising a main body having a mounting shank adapted for connection with the power delivering end of a percussive power unit operable to reciprocate said chuck device axially of its mounting shank, said chuck body having a tapering seating socket for receiving the tapered shank of a working tool, a transverse bore intersecting the inner portion of said socket, drift pin means movably mounted in said bore having a cam surface thereof movable crosswise of the end of a tool shank to dislodge the same from seating engagement in said socket, said drift pin means having a hand grip thereon projecting radially from said chuck and normally adapted to rotate said chucking device and a tool mounted therein through small increments as the latter is being reciprocated to vary the point of attack of the working tool.

3. A working tool chuck device as defined in claim 2 including spring means interposed between said chuck body and said drift pin means normally urging said drift pin to a retracted position wherein it is ineffective to disengage a tool from said chuck.

4. A working tool chuck device as defined in claim 2 wherein the outer free end of said drift pin means remote from the body of said chuck is covered with resilient material to form a hand grip.

5. A working tool chuck device as defined in claim 4 wherein said spring means comprises a compression spring encircling said drift pin means with one end abutting the chuck body and its other end acting to urge said pin means out of engagement with the shank of a working tool mounted in the chuck socket.

6. A tool chucking device comprising a pair of relatively movable parts held assembled and in a predetermined relative position by a spring interposed between portions of each part, a first one of said parts comprising a main body member adapted to be clamped to a percussive power unit and having a tool mounting socket in the axial end thereof and a transverse bore slidably supporting said second part therewithin, said second part providing a handle by which said main body member can be shifted to different angular positions about the axis of said tool mounting socket, and said second part being axially movable in opposition to said spring to bring a cam surface thereon into engagement with a tool mounted in said socket to force the tool out of seating engagement with the socket.

References Cited in the file of this patent

UNITED STATES PATENTS

| | | |
|---|---|---|
| 894,250 | Woods | July 28, 1908 |
| 1,091,447 | Wagner | Mar. 24, 1914 |